(12) United States Patent
Boukobza (10) Patent No.: US 8,826,370 B2
(45) Date of Patent: Sep. 2, 2014

(54) SYSTEM AND METHOD FOR DATA MASKING (75) Inventor: Eric Boukobza, Tel Aviv (IL)

(73) Assignee: Informatica Corporation, Redwood City, CA (US)

( * ) Notice: Subject to any disclaimer, the term of this patent is extended or adjusted under 35 U.S.C. 154(b) by 0 days.

(21) Appl. No.: 13/427,406

(22) Filed: Mar. 22, 2012

(65) Prior Publication Data
US 2012/0246696 A1 Sep. 27, 2012

Related U.S. Application Data (60) Provisional application No. 61/466,112, filed on Mar. 22, 2011.

(51) Int. Cl.
*H04L 29/06* (2006.01)
(52) U.S. Cl.
USPC .......................................................... 726/1
(58) Field of Classification Search
None
See application file for complete search history.

(56) References Cited

U.S. PATENT DOCUMENTS

| | | | |
|---|---|---|---|
| 2002/0095405 A1* | 7/2002 | Fujiwara | 707/3 |
| 2006/0277595 A1 | 12/2006 | Kinser et al. | |
| 2007/0283029 A1 | 12/2007 | Deshpande et al. | |
| 2009/0288104 A1* | 11/2009 | Bagepalli et al. | 719/328 |
| 2010/0030737 A1 | 2/2010 | Scheuber-Heinz et al. | |

OTHER PUBLICATIONS

International Search Report corresponding to International Application No. PCT/IB12/00697, Aug. 28, 2012.
Written Opinion corresponding to International Application No. PCT/IB12/00697, Aug. 28, 2012.

* cited by examiner

*Primary Examiner* — Brandon Hoffman
(74) *Attorney, Agent, or Firm* — Marc S. Kaufman; Amardeep S. Grewal; Reed Smith LLP (57) ABSTRACT

A system and computer-implemented method for providing security rules to an existing enterprise database system. The disclosed system and computer-implemented method intercepts database connection requests provided by third-party applications and end-users and determines what, if any, security rules to be applied to the request, including masking, scrambling and unmasking the data, as well as whether the requesting user has a need to know the requested data. Accordingly, personally identifiable and other sensitive information is not provided to an unauthorized requesting application and/or end-user.

36 Claims, 5 Drawing Sheets

SYSTEM AND METHOD FOR DATA MASKING

RELATED APPLICATION DATA

This application claims priority to U.S. Provisional Patent Application No. 61/466,112, filed Mar. 22, 2011, which is hereby incorporated by reference in its entirety.

BACKGROUND

Database Management Systems (DBMS) provide capabilities for storing and managing data, including the ability to add new data, delete unwanted data and change (or update) existing data. DBMS may follow one of several data models, including hierarchal, network and relational. Relational Database Management Systems (RDBMS) are based on the theory of sets and relations, wherein data is represented in the form of a table. A table is generally understood in the art as a two-dimensional array containing rows and columns. For example, each row may contain data related to an entity and each column may contain attribute data related to that entity.

RDBMS implementations allow for dynamic relationships between entities using the values of the columns. A table may include a primary key or composite primary key used to identify each unique entity in a table. Similarly, in implementations where more than one relational database is being utilized a foreign key may be used to join one or more tables to retrieve data corresponding to an entity.

Accordingly, RDBMS have become one of the most popular DBMS in the data management industry, and RDBMS has captured more than 20% of the DBMS market. RDBMS are often implemented for various applications, ranging from e-commerce to electronic banking RDBMS provide an advantageous combination of affordability, performance, ease of development and sophisticated analytical features, which, collectively, have lead to a high rate of adoption for RDBMS in enterprise systems. Almost all RDBMS implementations (e.g. Oracle) use Structured Query Language (SQL) for data manipulation and retrieval. SQL is the standard language for relational database systems. SQL queries may be submitted to a database by an application, as is commonly understood in the art.

DETAILED DESCRIPTION

There is a need in the art for an efficient and effective system and method that is application agnostic and provides transparent privacy controls to existing RDBMS implementations. As a consequence of the high adoption rate of RDBMS in enterprise systems and the integral nature of database usage within an enterprise, a database attack can cause significant monetary damage to an organization, as well as data loss that cannot be expressed in simply monetary value. Legal regulations require organizations to verify that the level of access granted to database users is based on the user's need to access the information (e.g. restrictions on access to personally identifiable information). These restrictions extend not just to end-users generally, but to an organization's functional employees, including, but not limited to, part-time workers, outsourced workforce, customer relations personnel, developers, IT personnel, database administrators, outsourced support teams, affiliate employees, and corporate partners.

In many cases, the adoption of an RDBMS implementation in an enterprise has outpaced the organization's ability to provide meaningful controls to the underlying data. For example, a customer relations employee may be required to query a customer account for address information concerning a shipment, yet much of the other data in the customer account is outside of the scope of the employee's role (e.g. full credit card information, social security number, mother's maiden name, etc.). In this example, the enterprise may have provided full or partial access to the tables in the database, and almost all data responsive to a query is provided in full form. Another example is the case of a non-production enterprise environment, wherein IT personnel who are tasked with confirming the operational capabilities of system do not have any need to know the actual contents of the underlying database.

The above-described shortcomings are most often related to cost. For example, the cost associated with updating legacy systems to a control-based and privacy-aware schema can be prohibitive depending on the organization's resources. Similarly, an organization may have expanded beyond the privacy controls that were originally implemented, or there are new uses for the data requiring broader access that were not considered at the time that the system was developed. Alternatively, the organization may have implemented a commercial-off-the-shelf (COTS) product that was plugged into existing infrastructure. In each case, the privacy controls are insufficient and there are no controls provided based upon a user's need-to-know.

Existing systems that provide database security features do not solve the problems in art, as disclosed here. First, existing systems may require that significant source code changes be made to applications that access databases in order to provide data security. Second, existing systems do not attempt to identify patterns in database requests and differentiate between requests for masked and unmasked data. Third, some existing systems implement screen scraping methodologies, but these implementations require tedious screen mapping solutions to be installed on a client PC and only mask the presentation layer, i.e. unmasked data is still transmitted over the network, and do not solve the problem in restricting access to development tools.

Various embodiments of the present invention will be described in detail with reference to the drawings. Reference to various embodiments does not limit the scope of the invention, which is limited only by scope of claims attached hereto. Additionally, any examples set forth in this specification are not intended to be limiting and merely set forth some of the many possible embodiments. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items.

The disclosed embodiments are a system and method to ensure that sensitive and personal information is not disclosed to customers, employees or users who do not have a need to know the full data included in a database. Stated another way, the disclosed embodiments provide a system and method for masking data based on customizable controls comprising a rule engine. For example, the disclosed embodiments mitigate security risks in production and non-production embodiments by providing "masked", "unmasked", "scrambled" or "unscrambled" production data without changing the source code of a querying application or the database.

In an embodiment, a masking module is installed between an application and a database. In this embodiment, the masking module operates as an in-line proxy that listens for all inbound application requests coming from the application and directed to the database, and development tool requests directed to the database. The masking module analyzes the received requests and performs security rules on the request as defined in a rules engine. The security rules may be applied in real-time, near-real-time or in compliance with a variable timer (for example, to avoid race conditions). The resulting request is then forwarded to the database for execution.

In a further embodiment, the system intercepts an SQL request and applies security rules in real-time. The SQL request may comprise, for example, "select name from table . . . ." The system may parse the request in real-time, and then apply security rules to the request. The security rules may rewrite the request to anonymize the SQL request, e.g., rewrite the request in such a manner that a response to the request will only return masked values (e.g. "select substr (name, 1, 2)| '**' from table . . . ), or with stored procedures. The rewritten request will then be forwarded on to the database. In the case of a query for a name, the database may return "Ro*", instead of "Robert"—thereby, ensuring that personal information never leaves the production database.

In yet a further embodiment, the system 100 is an application agnostic platform, wherein any commercially packaged or home-grown application can interface with the system 100 to limit access to data contained in a database, including, but not limited to, Siebel, Peoplesoft, Amdocs and LHS Billing systems, Oracle Apps ERP Suite, Clarify, HR Access, Business Objects, Cognos, Crystal Reports, Brio, SQRIBE or any other commercial database system known in the art. The system 100 does not require client installations, application changes or database modifications because the data stored in the database is not changed and all referential data integrity remains intact.

Figure 1:
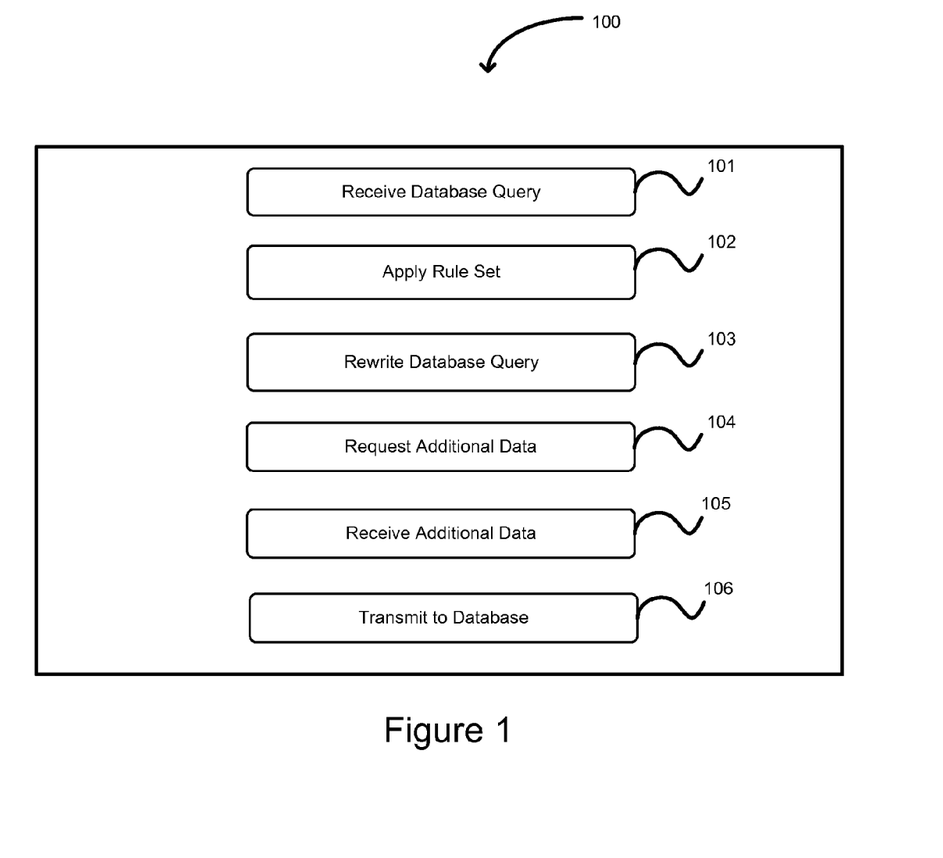
FIG. 1 is a functional flow block diagram of an exemplary system.

FIG. 1 depicts and overall view 100 of an embodiment. In an embodiment, system 100 monitors a database listener port to monitor incoming connections. The system intercepts or otherwise receives a database connection request 101. The database connection request may comprise an SQL query for data in the database. A database connection request may further comprise one or more of a program file name, a host name, a operating system user name, an include list comprising a list of program file names/host names and OS users that identify an application group for a specified action, and an exclude list comprising a list of program file names/host names and OS users that are excluded from access.

The database connection request 101 may be parsed to determine whether a rule set should be applied 102, or whether the request should be directly connected to the database and bypass the remainder of the system 100 functionality, or refused and return an error message to the requesting application/user. Alternatively, the database connection request 101 may be routed to an alternate database system (e.g. a mirror).

Figure 2:
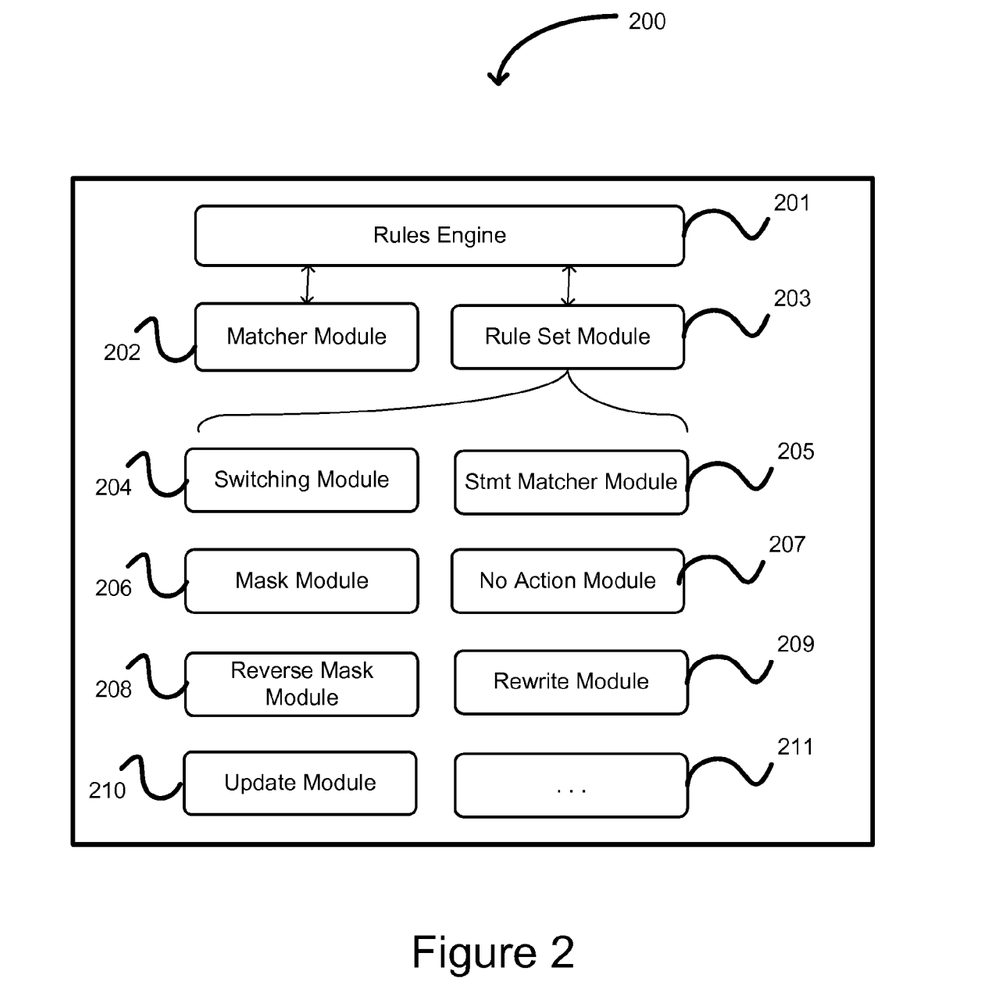
FIG. 2 is a functional flow block diagram of an exemplary system.

A rule set may be applied 102 to the database connection request 101. Referring to FIG. 2, the rule set 203 may comprise switching 204, statement matching 205, masking 206, no action 207, reverse masking 208, rewrite 209, update 210, scramble 211 or other rules 212 that may be defined by the enterprise.

Referring to FIG. 1, in accordance with the rule set applied or identified and to be applied 102, the database connection request 101 may be rewritten 103. Rewriting of the database connection request 103 comprises replacing an SQL statement with an alternate statement, e.g., replacing values within a request statement, masking the contents of a table and column, or scrambling values. For example, bind variable naming conventions may be used in order to define a rewrite to a database connection request 101.

In the case where the database connection request 101 is determined by the rule set 102 to be lacking necessary information, the system 100 may request additional data from the database 104. For example, a particular case may require specific columns which are not known in the context of the SQL statement (such as select * from . . . or when running a stored procedure), the system 100 may query the database or another repository for the missing information, e.g., the list of column names that will be used by the SQL statement. The additional data responsive to the request for additional data may be received 105 by the system 100 from the database or other repository.

The rewritten database connection request 103 or an unmodified database connection request may be transmitted to the database for processing 106. In an embodiment, the rewritten request 103 may appear to originate directly from a requesting application to the database. Alternatively, in a further embodiment, the rewritten request 103 may include information indicating that it has been processed by the system 100. The database may provide a response to the request 103 provided by 106, but the response may be directed directly to the requesting application or user. Alternatively, in a further embodiment, the response may be received by the system 100 for further processing or validation processes, as is appreciated by those skilled in the art.

Referring to FIG. 2, the rules engine 201 may comprise a rule set 203. A rule set is a collection of rules that dictate how a database connection request 101 should be processed. The rules engine 201 may further comprise a matcher module 202. The matcher module 202 determines the users and applications that can access the database. The module 202 may use requesting application information, such as the user name, host information, and program name to define the connection criteria for the matcher module 202. The matcher module 202 may comprise include and exclude lists to enable the management of users and applications having access to the database. By way of non-limiting example, the matcher module may have an exclude list that excludes applications or users in the customer service group of an enterprise from accessing columns that contain customer social security numbers, or other personally identifiable information. Alternatively, development applications may be provided with restricted access and database administrators may be granted full-unmasked access to the database.

The matcher module 202 may further define which rules in the rule set 203 are relevant to the database connection request 101. For example, a first group of users/applications may be granted scrambled data and second group of users/applications may be granted partially scrambled data responsive to the request. In an embodiment, the matcher module 202 parses the exclude list first. Requests 101 that are on the exclude list may bypass the remainder of the system 100 and may receive either error messages from the system 100, or may be forwarded to the database for error messages to be provided by the database. The matcher module 202 may then parse the include list to determine which rules in the rule set 203 are relevant to the request 101.

The rule set 202 comprises a collection of rules for handling database connection requests 101, 204, 205, 206, 207, 208, 209, 210, 211 and 212. The rules define the criteria that the rules engine 201 uses to mask data and perform other operations on a SQL request 101. The switching module 204 defines the connection criteria that the rules engine 201 uses to identify a connection and the target database. In an embodiment, the switching module 204 may operate in conjunction with the matcher module 202 and one or more rules in the rule set 203 to identify an action and a route for the request 101. In an embodiment, a switching rule in the switching module 204 may include a rule name, a matching criteria (e.g. all incoming connections, client/application information, current target database, database listener port for the system 100), an action (e.g. nothing 207, switch to database 204, use rule set 203, refuse, direct), and a statement processing action 205 (e.g. stop if applied, stop if matched, continue).

As is to be appreciated by those skilled n the art, a SQL regular expression may comprise one or more character literals and/or meta-characters. In its simplest format, a regular expression can consist only of character literals such as the regular expression 'cat', location, and catalog. Meta-characters provide algorithms that specify how the system 100 should process the characters that make up a regular expression. Data validation, identification of duplicate word occurrences, detection of extraneous white spaces, or parsing of strings are just some of the many uses of regular expressions. Moreover, patterns (e.g. numbers, dates) or anything that fits any pattern within any textual data and replaces them with other patterns may be located.

In an implementation, the period ('.') matches any character (except newline) in a regular expression. For example, the regular expression a.b matches a string containing the letter a, followed by any other (except newline), followed by the letter b. The strings axb, xaybx, and abba are matches because this attern is buried in the string. In the case where exact three-letter matches are desired in which the line begins with a and ends with b, the regular expression may be anchored. Therefore, the regular expression ^a.b$ matches the strings aab, abb, or axb. The rule set 102 incorporates regular expressions and other parsing and identification methods known in the art. Relevant regular expression meta-characters include, but are not limited to, '\t', '.', '|', '[ ]', '[^]', '*', '+', '?', '^', '$', '( )', '\', '\Q', '\E' and '\S'.

In an embodiment, the rule set 102 may apply a regular expression matcher to the database connection request 101 to determine if one of the defined patterns hits on the request 101. The table may then be parsed and a list of aliases may be built according to the required tables. The statement may then be searched for '*' in the select list which is then rewritten to be the list of columns. For example, if the request 101 is 'select * from employees', and the 'employee' table is defined as a sensitive object, the system 100 may apply a mask rule 206 to the request 101, wherein 'select * from employees' is rewritten as select "EMP"."EMPNO", substr("EMP"."ENAME", 1,3)||'xxx'

"ENAME"."JOB", "EMP"."MGR", "EMP"."HIREDATE", 100 "SAL",

"EMP"."COMM", substr("EMP"."DEPTNO",1,2) "DEPTNO" from employees

In the foregoing example, certain defined columns have a masking function 206 applied to their data values.

In further embodiments, a mask rule 206 may, by way of non-limiting example, hide the contents of a column completely, replace the returned personally identifiable information with the word 'security' or other string, apply a constant date, apply row level security (e.g. append identifier or substitute a customer name based on customer type), replace account numbers with fictitious account numbers (or, alternatively, replacing account numbers but maintaining the validity of the first four digits) or otherwise anonymize a customer name through one or more of the above discussed techniques. The mask rule 206 may be applied to columns used across multiple tables or even columns having similar names (e.g. all columns starting with "credit").

In an embodiment, data masking 206 may comprise a series of steps that may be executed prior to and/or during the masking 206, including, but not limited to, classifying data into one of several categories (e.g. highly sensitive data, moderately sensitive data and non-sensitive data) and identifying applications that use private data. Relevant data types for classification may include credit card numbers, passport numbers, last names, addresses, account numbers, social security numbers, financial data, names, date of birth, etc.

Similarly, the mask rule 206 may include data scrambling rules. As is to be appreciated by those skilled in the art, data scrambling is a technique that rearranges values in the requested data. In an embodiment, the data scrambling rules may use Oracle database syntax and may include, but are not limited to, scrambling the location of the digits (e.g. "translate (reverse(\(col)), '1234567890', '97865301')"); list scrambling wherein the name and letter value is replaced with that of the preceding and subsequent records (e.g. "max(\(col)) over (order by empno rows between 1 and preceding and 1 following)"); or offsetting a value by a single row (e.g. "nvl (lead(ename) over (order by ename), first_value(ename) over (order by ename)").

In a further embodiment, a reverse mask 208 may be applied to the request 101. For example, in the case where a user or an application sends a request to the database for a customer account number, the system 100 may have applied a mask rule 206. The subsequently returned data is a masked value. If the user or the application requires additional information about the customer, the user or the application may submit another request for data to the database. However, this second request may only reference the masked customer account number that was previously received (and would produce an error message from the database). Accordingly, the system 100 may apply a reverse mask 208 to ensure that valid data is returned. In an embodiment, a search and replace rule may be executed to accomplish the reverse mask 208, e.g., replacing the masked "where" clause may with the real data. For example, a mask function may be substr(\col(col),1,6)||translate('1234','3412', substr(\ (col), 7))||substr(\(col), 11)

In this example, the reverse function may be applied on the 'where' clause condition Search and replace action with search text:

ACCOUNT\s*=\s*(\:\w+)

Replace with:

ACCOUNT=Substr(\(1),1,6)||translate('3412','1234', substr(\(1),7))||substr(\(1),11)

In a further embodiment, it is desirable to allow applications and users execute updates to the database. That is, applications must also be able to update the values in the database. However, because in some implementations of the system 100 a user may only be provided with masked values, there is the risk that masked data may be retransmitted to the database along with data sought to be updated. The system 100 may block all updates to certain columns, e.g., personally identifiable information. Alternatively, the system may include update rules 210 for allowing all update requests, specific update requests that match defined criteria, or rewriting an update request to include a reverse mask function 208.

The system 100 may be further configured to provide role based access control to a database. That is, in certain cases, the security rules 203 should only be applied on certain application users. These users may be customers or partners that should not be allowed access to sensitive data (as may be defined by a data classification model). Authorized or unauthorized users may be defined by a pre-defined list, network user groups or database user roles. However, in certain enterprise environments, users may connect to the database via a single generic user account. Therefore, the system 100 may identify access restrictions by parsing the request 101 to identify a username provided by the requesting application, or require that all authorized users connect via a single access point, whereas unauthorized users are to be connected via an alternative access point for processing by the system 100.

Figure 3:
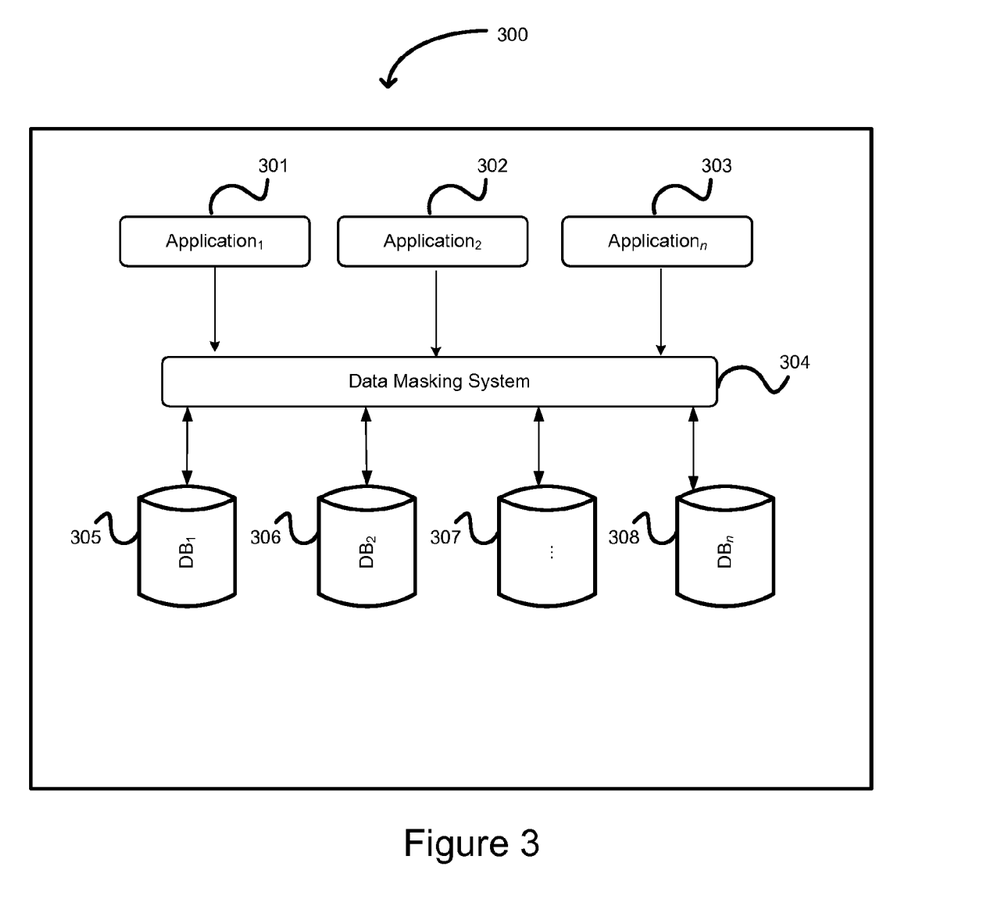
FIG. 3 is a functional flow block diagram of an exemplary system.

Referring to FIG. 3, multiple applications 301, 302, 303 may make direct connections to the system 100, 304 for access to one or more databases 305, 306, 307, 308. In an embodiment, the applications are configured to utilize a designated port for database connections and the system 100, 304 is configured to listen to that database port to intercept incoming requests designated for the database. Alternatively, the system 100, 304 may be configured as a proxy to which the applications 301, 302, 303 are configured to transmit database requests through.

Figure 4:
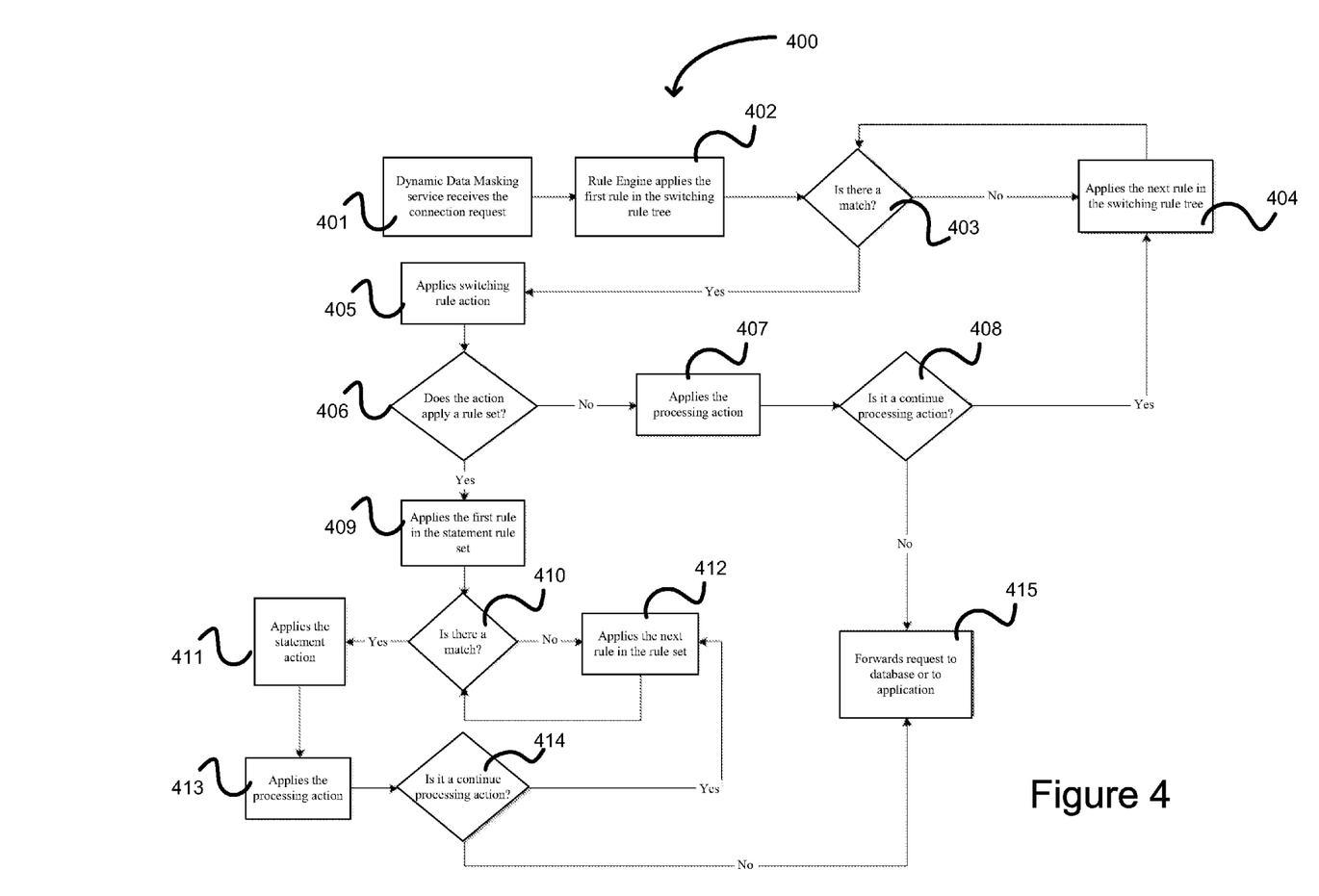
FIG. 4 is a functional flow block diagram of an exemplary system.

Referring to FIG. 4, a further embodiment may include a rule tree 400 for processing database connection requests 101. The system 100 receives a connection request 401 and the rules engine applies the first rule in the switching rule tree 402. If there is a match 403, then the switching rule action is applied 405. If there is not a match, then the next rule in the switching is applied to the request 101 at 404, and is checked for a match again 403. If a switching rule action is applied 405 and the action applies a rule 406, then the first rule in the statement rule set is applied to the request 101 at 409. This process repeats in iterative process as subsequent rules are applied, 410, 412, 411, 413. In the event that all rules have been applied and no continuing action is required, then the request may be forwarded to its destination 415.

Figure 5:
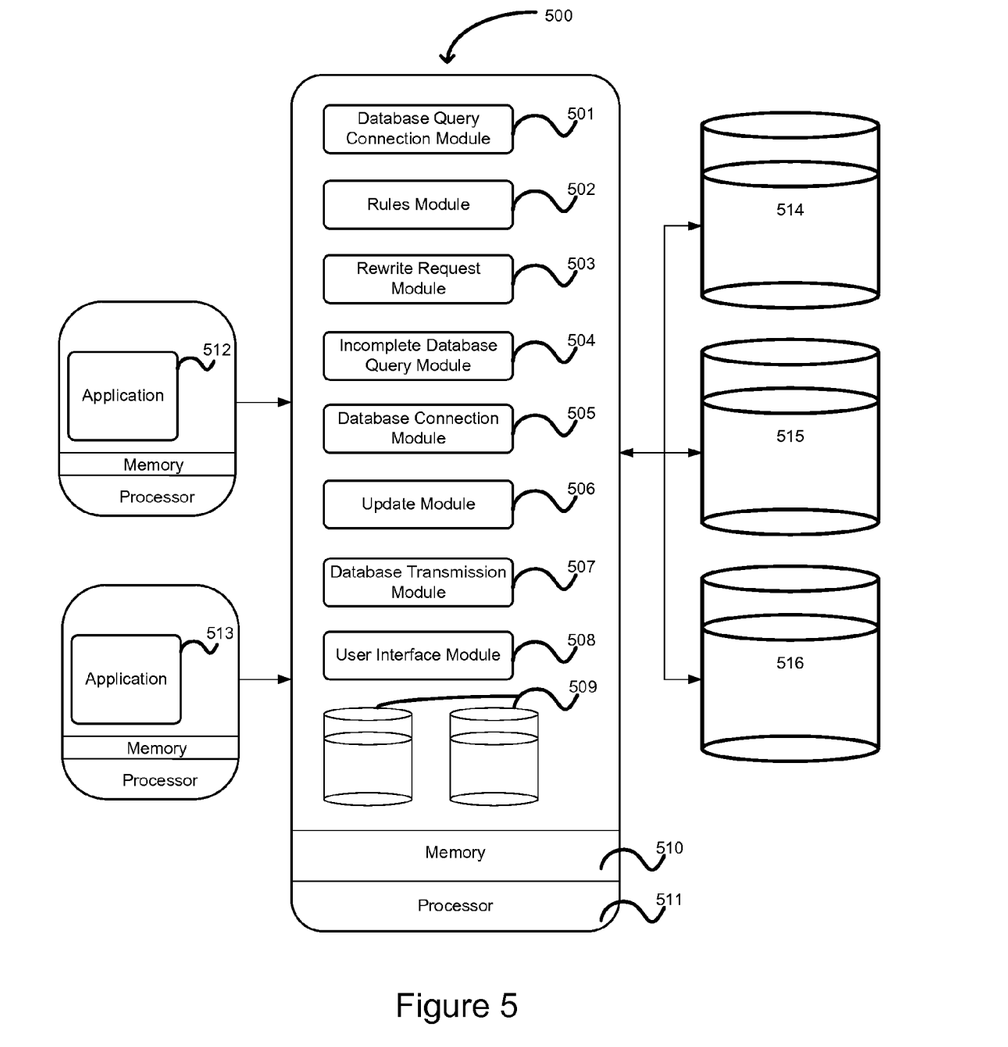
FIG. 5 is a functional flow block diagram of an exemplary system.

Referring to FIG. 5, a further embodiment 500 may include a computer having at least a processor 511 and memory 510, a database query connection module 501 (which may include any aspects disclosed in the embodiments corresponding to 100, 401, 101), a rules module 502 (which may include any aspects disclosed in the embodiments corresponding to 100, 102, 200, 400), a rewrite request module 503 (which may include any aspects disclosed in the embodiments corresponding to 100, 103), an incomplete database query module 504 (which may include any aspects disclosed in the embodiments corresponding to 100, 104), a database connection module 505 (which may include any aspects disclosed in the embodiments corresponding to 100, 105), an update module 506 (which may include any aspects disclosed in the embodiments corresponding to 100, 210) and a database transmission module 507 (which may include any aspects disclosed in the embodiments corresponding to 100, 106, 415). A user interface module 508 may be further provided to allow configuration of the above-described modules and entry and editing of rules by an administrator.

Database connection requests may be received from a plurality of applications 512, 513, each running on a computer. The one or more databases comprising data responsive to the database connection requests may be on the same computer as the above-described modules, 509, or located elsewhere 514, 515, 516. For example, one or more of the databases may be located on a server and accessible via the network, as is understood by those skilled in the art. Any means of communication between the applications, the system 100, 500 and databases may be utilized, including, but not limited to, TCP/IP and other network transfer protocols.

The various modules consist of computer software code recorded on computer readable media and executed by a processor. The modules are segregated by function in this description for the purpose of clarity of description, but need not be discrete devices or code portions. The modules can be segregated or integrated in any manner. Various computer devices can be used to implement the embodiments, such as Servers, PCs, laptop computers, tablets, handheld computing devices, mobile devices or various combinations of such devices.

What is claimed is:

1. A computer system for masking data, the system comprising:
   one or more processors; and
   one or more memories operatively coupled to at least one of the one or more processors and having instructions stored thereon that, when executed by at least one of the one or more processors, cause at least one of the one or more processors to:
   receive a database query request directed to a database;
   apply a rule set to the database query request to identify one or more sensitive columns in the database which are responsive to the database query request;
   rewrite the database query request, based on the rule set, such that the rewritten request will result in data from the one or more sensitive columns being retrieved and converted into a masked format according to one or more instructions in the rewritten request; and
   transmit the rewritten request to the database.

2. The system of claim 1, wherein the receiving step is accomplished by a proxy.

3. The system of claim 1, wherein the database query request is intercepted.

4. The system of claim 1, wherein the masked format is a format that masks at least a portion of the data that is responsive to the database query request.

5. The system of claim 1, wherein the masked format is a format that concatenates a string to at least a portion of the data that is responsive to the database query request.

6. The system of claim 1, wherein database query request is a request for data that comprises personally identifiable information.

7. The system of claim 1, wherein the database query request is a request for data that comprises confidential information.

8. The system of claim 1, wherein the rule set includes rules for restricting access based upon user classification.

9. The system of claim 1, wherein the instructions that, when executed by at least one of the one or more processors, cause at least one of the one or more processors to apply the rule set further cause at least one of the one or more processors to:
   apply a request complete query rule, wherein the request is determined to be incomplete;
   transmit a request for missing data to the database, wherein the missing data is the incomplete portion of the database query request;
   receive the missing data from the database; and
   reformat the database query request with the missing data.

10. The system of claim 1, wherein the instructions that, when executed by at least one of the one or more processors, cause at least one of the one or more processors to apply the rule set further cause at least one of the one or more processors to:

apply a reverse mask query rule, wherein the request is determined to comprise masked data; and rewrite the request, based on the rule set, such that the request is rewritten to reverse mask the masked data.

11. The system of claim 1, wherein the instructions that, when executed by at least one of the one or more processors, cause at least one of the one or more processors to apply the rule set further cause at least one of the one or more processors to:

apply a update query rule, wherein the request is determined to be an update request; and transmit the update request to the database.

12. The system of claim 1, wherein the instructions that, when executed by at least one of the one or more processors, cause at least one of the one or more processors to apply the rule set further cause at least one of the one or more processors to determine a masking rule based at least in part on requesting application information, wherein the masking rule defines how the database query request will be rewritten.

13. At least one non-transitory computer-readable medium storing computer-readable instructions that, when executed by one or more computing devices, cause at least one of the one or more computing devices to:

receive a database query request directed to a database;

apply a rule set to the database query request to identify one or more sensitive columns in the database which are responsive to the database query request;

rewrite the database query request, based on the rule set, such that the rewritten request will result in data from the one or more sensitive columns being retrieved and converted into a masked format according to one or more instructions in the rewritten request; and transmit the rewritten request to the database.

14. The at least one non-transitory computer-readable medium of claim 13, wherein the database query request is received by a proxy.

15. The at least one non-transitory computer-readable medium of claim 13, wherein the database query request is intercepted.

16. The at least one non-transitory computer-readable medium of claim 13, wherein the masked format is a format that masks at least a portion of the data that is responsive to the database query request.

17. The at least one non-transitory computer-readable medium of claim 13, wherein the masked format is a format that concatenates a string to at least a portion of the data that is responsive to the database query request.

18. The at least one non-transitory computer-readable medium of claim 13, wherein database query request is a request for data that comprises personally identifiable information.

19. The at least one non-transitory computer-readable medium of claim 13, wherein the database query request is a request for data that comprises confidential information.

20. at least one non-transitory computer-readable medium of claim 13, wherein the rule set includes rules for restricting access based upon user classification.

21. The at least one non-transitory computer-readable medium of claim 13, wherein the instructions that, when executed by at least one of the one or more computing devices, cause at least one of the one or more computing devices to apply the rule set further cause at least one of the one or more computing devices to:

apply a request complete query rule, wherein the request is determined to be incomplete;

transmit a request for missing data to the database, wherein the missing data is the incomplete portion of the database query request;

receive the missing data from the database; and reformat the database query request with the missing data.

22. The at least one non-transitory computer-readable medium of claim 13, wherein the instructions that, when executed by at least one of the one or more computing devices, cause at least one of the one or more computing devices to apply the rule set further cause at least one of the one or more computing devices to:

apply a reverse mask query rule, wherein the request is determined to comprise masked data; and rewrite the request, based on the rule set, such that the request is rewritten to reverse mask the masked data.

23. The at least one non-transitory computer-readable medium of claim 13, wherein the instructions that, when executed by at least one of the one or more computing devices, cause at least one of the one or more computing devices to apply the rule set further cause at least one of the one or more computing devices to:

apply a update query rule, wherein the request is determined to be an update request; and transmit the update request to the database.

24. The at least one non-transitory computer-readable medium of claim 13, wherein the instructions that, when executed by at least one of the one or more computing devices, cause at least one of the one or more computing devices to apply the rule set further cause at least one of the one or more computing devices to determine a masking rule based at least in part on requesting application information, wherein the masking rule defines how the database query request will be rewritten.

25. A method for masking data executed by one or more computing devices, the method comprising the steps of:

receiving, by at least one of the one or more computing devices, a database query request directed to a database;

applying, by at least one of the one or more computing devices, a rule set to the database query request to identify one or more sensitive columns in the database which are responsive to the database query request;

rewriting, by at least one of the one or more computing devices, the database query request, based on the rule set, such that the rewritten request will result in data from the one or more sensitive columns being retrieved and converted into a masked format according to one or more instructions in the rewritten request; and transmitting, by at least one of the one or more computing devices, the rewritten request to the database.

26. The method of claim 25, wherein the receiving step is accomplished by a proxy.

27. The method of claim 25, wherein the database query request is intercepted.

28. The method of claim 25, wherein the masked format is a format that masks at least a portion of the data that is responsive to the database query request.

29. The method of claim 25, wherein the masked format is a format that concatenates a string to at least a portion of the data that is responsive to the database query request.

30. The method of claim 25, wherein database query request is a request for data that comprises personally identifiable information.

31. The method of claim 25, wherein the database query request is a request for data that comprises confidential information.

32. The method of claim 25, wherein the rule set includes rules for restricting access based upon user classification.

33. The method of claim 25, wherein the applying the rule set step further comprises the steps of:
  applying, by at least one of the one or more computing devices, a request complete query rule, wherein the request is determined to be incomplete;
  transmitting, by at least one of the one or more computing devices, a request for missing data to the database, wherein the missing data is the incomplete portion of the database query request;
  receiving, by at least one of the one or more computing devices, the missing data from the database; and
  reformatting, by at least one of the one or more computing devices, the database query request with the missing data.

34. The method of claim 25, the applying the rule set step further comprises the steps of:
  applying, by at least one of the one or more computing devices, a reverse mask query rule, wherein the request is determined to comprise masked data; and
  rewriting, by at least one of the one or more computing devices, the request, based on the rule set, such that the request is rewritten to reverse mask the masked data.

35. The method of claim 25, the applying the rule set step further comprises the steps of:
  applying, by at least one of the one or more computing devices, a update query rule, wherein the request is determined to be an update request; and
  transmitting, by at least one of the one or more computing devices, the update request to the database.

36. The method of claim 25, wherein applying a rule set to the database query further comprises:
  determining, by at least one of the one or more computing devices, a masking rule based at least in part on requesting application information, wherein the masking rule defines how the database query request will be rewritten.

* * * * *